Patented Dec. 12, 1933

1,938,647

UNITED STATES PATENT OFFICE.

1,938,647

CONVERSION PROCESS FOR ORGANIC WASTES

George H. Earp-Thomas, Glen Ridge, N. J.

No Drawing. Application October 23, 1931
Serial No. 570,757

16 Claims. (Cl. 71—10)

The present invention relates to a bacteriological process for the conversion of garbage and other organic wastes into a relatively innocuous end product capable of conversion directly into fertilizer.

One of the objects of the invention is to convert garbage and other offensive organic waste, by bacteriological means involving the employment of thermophile micro-organisms, into a dry readily pulverized product entirely devoid of offensive odors and substantially free from harmful matter.

A further object of the invention is to treat organic waste, such as garbage, by means of selected strains of micro-organisms derived from soil, in conjunction with the proper environmental media, so as to enhance the growth of thermophile soil bacteria in preference to other simultaneously present putrefactive bacteria for the purpose of eventually eliminating the latter class of bacteria by reason of the heat developed by the changes brought about by the thermophile bacteria and the enzymes thereby produced.

Still a further object of the invention is to subject garbage or other similar organic trade waste to a process which involves comminution, removal of surface moisture, admixture of the dewatered product with a culture base favorable to the desired development of the bacterial life, followed by inoculation of the material thus derived with a strain of non-gas-producing thermophile bacteria, followed by introduction of the mixture into a specially devised digesting apparatus consisting of a number of superimposed decks in conjunction with slowly rotating plows or rakes which gradually transfer the material from a higher to a lower deck, where the desired bacterial action progressively takes place.

A further object of the invention is to produce a fertilizer from the substantially dry product resulting from the operations hereinbelow described, by mixing said product with strains of resistant beneficial soil-bacteria such as nitrifying bacteria and the like, phosphates, potash, and other plant foods, so as to eventuate a fertilizer ready for use and which when spread upon the soil and plowed thereinto will enrich the soil both by the therein contained phosphates, potash and nitrogen compounds and by binding additional nitrogen from the air by reason of the action of the said nitrifying bacteria.

Further objects of the invention will become apparent from the further description and claims hereinbelow.

In my copending application Serial No. 559,048, filed August 24, 1931, I have described a special apparatus particularly designed for carrying out the present invention. It is, however, to be understood that the present application refers only to the process stages of my invention and is in no wise limited by the apparatus employed; and, although the apparatus is inferentially referred to, it is to be understood that this is merely in the nature of an explanation and not of a limitation.

The fundamental principle upon which the present invention is based is the reaction that takes place in nature when organic waste material is mixed with normal fertile soil. It is known, for example, that soil in good tilth teems with bacterial life of all kinds but predominantly with non-gas-forming bacteria capable of liquefying carbohydrates, of converting proteids into nitrates and ammonia salts, and of decomposing—by reason of the acidity formed—some of the potassium-containing silicates in the soil, with the resulting liberation of available potash for use of the plants growing in the soil.

Now, in accordance with the present invention, I have adapted this natural process to large scale operations by a careful selection of the most useful strains of bacteria contained in the said soil and their application to the material to be treated under conditions where the heat resulting from the exothermic reactions brought about by the bacteria is conserved so as to serve as a pasteurizing means for the resultant product; that is to say, the heat developed during the digestion of the garbage or trade waste is not allowed to escape freely but, on the other hand, is under accurate control. This results in the gradual elimination, by thermal death, of the undesirable putrefactive and gas-forming bacteria while at the same time a beneficent flora of desirable thermophile bacteria will be set up in the entire digesting system.

The term "thermophile bacteria" is used herein to refer to those types of micro-organisms that thrive best at temperatures considerably above blood-heat (i. e. at above 98° F.); and particularly such as are capable of living at temperatures above the thermal death point of ordinary bacteria. Suitable bacteria for the present purpose are those capable of withstanding temperatures up to about 180° F.

While I am aware that garbage has been cooked and digested with various types of bacteria, particularly by means of ferments, and has been hydrolyzed by acids, I am not aware that it has ever been proposed to employ natural garbage and other similar organic trade wastes on the one hand and suitable culture media on the other hand, both in admixture with selected strains of bacteria resistant to heat, whereby a definitely controlled and controllable decomposition of the garbage or other trade waste can be effected on a large scale at a minimum cost.

My process contemplates the following steps substantially in the sequence recited, although my invention is not limited thereto, the invention being set forth in the appended claims, namely:

(1) The comminution or grinding of the garbage;

(2) The extraction therefrom of surplus water, which may be done by means of centrifugals, sieves or, preferably, squeeze-rolls;

(3) The admixture of the garbage or other trade waste with a selected medium favorable to the development of the desired micro-organisms such as bacteria, molds, fungi, etc., this medium consisting of peat humus, pulverized lime stone, and pulverized natural gypsum (calcium sulphate);

(4) The inoculation of the resulting mixture with bacterial cultures containing the desired thermophile non-gas-forming bacteria;

(5) The fermentation of the said mixture in substantially dry form under conditions of carefully controlled heat efflux until a substantially pulverulent digestion product is obtained, which (6) may or may not be further dried and (7) may be used as obtained or in admixture with nitrogen bacteria and other beneficial soil-bacteria and phosphates, potash, or other fertilizing ingredients.

I will now describe a preferred method of obtaining from natural soil the desired strains of bacteria. I have discovered that the thermophile bacteria in the soil grow particularly well in a medium consisting of a mixture of peat humus, garbage, cane molasses, hardwood ashes, calcium carbonate, and gypsum; and that, when these materials are compounded in the proper proportion, there will be a rise in temperature sufficiently high to rise above the thermal death point of all undesirable putrefactive bacteria.

In carrying out my process commercially and in order to obtain a supply of the desired bacteria, which—for the purposes of the present invention—I may call my "starter", I proceed as follows: In a small barrel there are mixed 5 lbs. of fertile organic soil taken from a field that is in good tilth,
 40 lbs. of peat humus,
 40 lbs. of ground-up common garbage,
 2 lbs. of cane molasses,
 2 lbs. of wood ashes,
 6 lbs. of marl or any other form of ground calcium carbonate, and
 10 lbs. of gypsum, these proportions being illustrated but not limiting. This material is mixed thoroughly, preferably adjusted to a moisture content of about 45%, and allowed to stand at a temperature not exceeding 180° F. There will be some development of heat due to the bacterial action both of the bacteria already contained in the garbage and those from the soil. As the temperature rises, however, the putrefactive and similar bacteria which are easily killed cease their activities and are destroyed because the mixture rises to a temperature above their thermal death point, i. e. above 180° F. whereafter digestion continues by the more resistant thermophile bacteria. At the end of four or five days, there will result a blackish appearing granular mixture which I employ as the starter for the inoculation of the product which is undergoing treatment on a commercial scale.

As a further disclosure of particular interest to those who desire to produce purer cultures, I may say that the thermophile bacteria may be isolated from the starter in substantially the following manner, which is practically the same as the standard process for producing pure strains of bacteria, employed in bacteriological laboratories: For example, I may prepare, let us say, about two liters of 1% dextrose agar medium containing 1½% of hardwood ashes, by standard bacteriological methods. I then prepare 20—6×¾ test tubes filled with 10 ml. of distilled water, which are plugged with cotton stoppers, and autoclave them for two and one-half hours at 15 lbs. steam pressure, thereby destroying all the living organisms. I then take one platinum loop full of the previously described mixed culture "starter" and dilute the same loop full of this mixed culture in the test tube containing 10 ml. of sterile distilled water. I mix the contents of the test tube thoroughly; then removing $\frac{1}{10}$ ml. from this tube, I add the $\frac{1}{10}$ ml. to another test tube containing 10 ml. of sterile distilled water. I then take $\frac{1}{10}$ ml. from the second test tube and add that to a third test tube containing 10 ml. of sterile distilled water. I repeat this procedure until I have obtained a one to one million (1:1,000,000) dilution. I then sterilize, let us say, 60 to 100 Petri dishes and 60 to 100—6¾ in. test tubes closed with cotton plugs. I then autoclave the above described dextrose-ash-agar medium until the medium is liquid. I then cool the medium to about 120° F. and half fill the above sterile Petri dishes and test tubes. When the medium has solidified in the Petri dishes and the test tubes, I then take $\frac{1}{10}$ of a ml. from some of the dilution tubes, all this being done under aseptic bacteriological conditions, and spread it on some of the Petri dishes.

I use up all the Petri dishes by plating them with different dilutions. I also make stab and slant cultures of the contents of the test tubes. I then incubate these Petri dishes and test tubes at a temperature of 55° to 60° C. for 24 hours. I then have a pure culture which can be transferred and propagated by the standard bacteriological methods and used for commercial purposes to manufacture fertilizer in accordance with the present invention.

However, while the above method will be productive of pure strains, I distinctly wish to state that it is entirely unnecessary to go to all this trouble, as the mixed bacteria obtained from the soil and garbage will be entirely satisfactory for commercial work; in fact, I have found that, by reason of the diversity of the products in the garbage, such a mixed flora is particularly desirable, and this is what I use in carrying out my process on a large scale.

Referring to my aforementioned copending application Serial No. 559,048, filed August 24, 1931, in which I have described a digester particularly suited for my process, the latter consists essentially of the following steps:—

Commercial garbage, as it is received at the plant, is first comminuted by being passed through any suitable grinding means such as a hammer mill, chopper, or the like. The product is then passed over dewatering means which may consist merely of sieves but, preferably, may comprise a set of squeeze-rolls between which the garbage is rolled and flattened, thereby wringing the excess water out of the same. The moist garbage issuing from the squeeze-rolls is then elevated into the digester and while on its way to the digester is mixed with quantities of conditioning material so as to bring about a suitable environment for the bacteria.

The material is used in the following proportions:

1 ton (2,000 lbs. avoirdupois) garbage,
80 lbs. peat humus,
20 lbs. carbonate of lime,
30 lbs. sulphate of lime (calcium sulphate).

At the same time there are also added from 4 to 6 oz. of the "starter" above described. This mixture is then discharged into the digester, namely, upon the upper deck thereof, where it is slowly but continually turned over by means of stirrers, rakes, or plows. Microbial action will soon manifest itself, and the temperature of the mass will rise. At this time, it may be well to point out that the function of the carbonate of lime is to neutralize substantially immediately any acids that may develop as a result of the fermentation or decomposition, as the organisms work most favorably in a medium whose hydrogen ion concentration is low, or slightly below the neutral point, and particularly at a pH of 7.5 to 8.0. It is, however, not desired to have actual alkalinity in the mixture, and the moisture content during this stage of the procedure is preferably between 50% and 90%. The temperature increase on the upper deck may rise to 110° to 120° F. As the material works its way to the center of the first deck, it will fall off the edge thereof and onto the second deck, where the fermentation will continue and the temperature will rise further. There are six or more decks in the apparatus, and by the time (about 24 to 36 hours) the material reaches the sixth deck or level its temperature is about 180° F. or even higher, and moisture is escaping from the material in the form of visible vapor which passes from the digester, being withdrawn by suitable ventilating means connected with each deck separately. Of course, a single ventilator for the entire digester will be within the scope of the invention. However, there is a distinct advantage in controlling the ventilation of each deck, as thereby a very great control of the temperature can be secured.

A draft is permitted throughout the apparatus during the process, as the thermophile bacteria involved in the decomposition are aerobes and require a plentiful supply of oxygen to maintain their activities.

The material leaving the digester will be found to have been reduced in moisture content to about 30%.

The product as it issues is substantially odorless or, at most, has an odor reminiscent of fresh soil and is at once available as an inexpensive and valuable fertilizer.

By reason of the temperature reached during this digestion, putrefactive and other undesirable organisms have been eliminated, as the temperature reached is above their thermal death point. Moreover, any thermophile bacteria that may remain are of a beneficent type, being naturally present in all soils, and hence are unobjectionable in a fertilizer; in fact, they even assist the decomposition of other organic material which may exist in the soil in which this fertilizer is employed.

Also in contemplation of the present invention and as a part thereof, a commercial fertilizer may be prepared by the use of the material issuing from the digester as one of a plurality of raw materials. For instance, the digested material may be further dried, for example, by passing the same through any standard type of internally-fired rotating dryer in which—should it be desirable—the temperature of the material may be raised to from 220° to 250° F. so as completely to sterilize the mass, in which case there will be no bacterial life in it whatever. In either event, that is to say, whether sterilized or not, the dry or dried material may be mixed with suitable quantities of acid phosphate (calcium acid phosphate—a commercially available fertilizing material), a potash salt such as sulphate or muriate, ammonia salts, or nitrates; such, for example, as ammonium sulphate or sodium nitrate.

If it is desired to make an inoculated mixed fertilizer, then it is desirable to use raw fertilizing material such as ground phosphate rock, leucite or other potash-bearing mineral, with which the product derived from the digester is mixed. Sulphur may be used as an additional ingredient.

While the invention has been described in connection with a special type of digester, it will be obvious that it is by no means absolutely dependent upon this particular apparatus. The invention may be carried out in any device in which aeration and slow stirring of the inoculated mass can be accomplished and from which the vapors arising as a result of the developed heat may escape under more or less accurate control.

What it is desired to protect by Letters Patent is the following:

1. The process of producing an inoffensive organic end-product from putrifiable organic waste material which comprises inoculating said material with thermophile aerobic bacteria to effect its bacterial decomposition, aerating and agitating said material and controlling its temperature during said decomposition, and drying the product thus obtained.

2. The process of producing an inoffensive organic end-product from putrefiable organic waste material which comprises inoculating said material with thermophile aerobic bacteria, agitating and aerating the resulting mixture, allowing a portion of the developed heat to escape, and preventing development of any appreciable acidity in the product during the bacterial digestion by carrying out the same in the presence of a neutral readily decomposable salt of a weak acid.

3. The process of producing an inoffensive organic end-product from putrefiable organic waste material which comprises inoculating said material with thermophile aerobic bacteria, agitating and aerating the resulting mixture, allowing a portion of the developed heat to escape, and preventing development of any appreciable acidity in the product during the bacterial digestion by carrying out the same in the presence of calcium carbonate.

4. The process of producing an inoffensive organic end-product from putrefiable organic waste material which comprises inoculating sa'd waste material with thermophile non-gas producing bacteria, mixing the same with a culture medium favorable to the development of said bacteria and carrying out the resulting bacterial exothermic decomposition under conditions where the developed heat is retained so as to raise the temperature of the digesting material to the thermal death point of the non-thermophile bacteria and other micro-organisms present in the waste, and finally drying the resulting product.

5. The process of producing an inoffensive organic end-product from putrefiable organic waste material which comprises comminuting said waste, removing any therein contained excess water, mixing the same with a culture medium favorable to thermophile bacteria, inoculating the mixture with thermophile bacteria, digesting, agitating and aerating the mixture while preventing escape of substantial amounts of developed heat therefrom whereby said mixture increases in temperature until the thermal death point of non-thermophile bacteria is reached, continuing the digestion of the mass with said thermophile bacteria until the moisture content of the mixture has been reduced to substantially less than 35%, and finally completely drying the product thus produced.

6. The process of producing an inoffensive organic end-product from putrefiable organic waste material which comprises comminuting said waste, removing any therein contained excess water, mixing the same with a culture medium favorable for the development and rapid growth of thermophile bacteria, inoculating the resulting mixture with a mixed culture of thermophile bacteria derived from soil, confining the mixture to prevent free escape of developed heat therefrom, agitating and aerating the mixture to enhance the bacterial action until the heat thereby developed rises to the thermal death point of non-thermophile bacteria, continuing the digestion substantially solely by the said thermophile bacteria until the product has a moisture content of less than 35%, and mixing said product with other fertilizing materials to produce a mixed fertilizer.

7. The process of producing an inoffensive organic end-product from putrefiable organic waste material which comprises comminuting said waste, removing any therein contained excess water, mixing the same with a culture medium comprising peat humus, gypsum and calcium carbonate, inoculating the resulting mixture with a mixed culture of thermophile bacteria derived from soil, confining the mixture to prevent free escape of developed heat therefrom, agitating and aerating the mixture to enhance the bacterial action until the heat thereby developed rises to the thermal death point of non-thermophile bacteria, continuing the digestion substantially solely by the said thermophile bacteria until the product has a moisture content of less than 35%, and mixing said product with other fertilizing materials, nitrogen-bacteria and soil-bacteria to produce a mixed inoculated fertilizer.

8. The process of producing an inoffensive organic end-product from putrefiable organic waste material which comprises digesting said material by means of thermophile soil-bacteria at a temperature range from 100–180° F. under aerobic conditions, and while slowly agitating said material.

9. The process of converting organic putrefiable waste material into a useful product which comprises destroying the deleterious putrefying and gas-forming bacterial life therein contained by means of heat self-developed in the material by the action of thereinto implanted thermophile micro-organisms.

10. The process of preparing a crude microbiologic culture in which the predominating flora is thermophile and stable at temperatures above 150°–160° F. which comprises mixing soil that is in good natural tilth with a culture medium comprising peat humus, gypsum, calcium carbonate, wood ashes, saccharine material and decomposing vegetable material, and permitting the resulting decomposition to progress with concomitant development of heat until the thermophile micro-organisms in the soil are the predominating strain and the non-thermophile micro-organisms have been killed off by the said heat development.

11. The process of treating organic putrescible waste material which comprises mixing the same with a culture medium consisting of peat humus, calcium carbonate and gypsum, inoculating the resulting mixture with thermophile micro-organisms, and digesting the mixture with said micro-organisms at a temperature range of from 80°–180° F.

12. The process of converting wet garbage into a relatively dry and innocuous end-product suitable as a fertilizer base which comprises the steps of comminuting said garbage, squeezing the excess water therefrom, mixing the same with humus, calcium carbonate, gypsum and a mixed culture of thermophile soil-bacteria, transferring the resulting mixture to a confined space, agitating and aerating it therein whereby heat develops as the result of the bacterial action thereby causing gradual elimination of moisture and further comminution of the product, controlling the escape of the heated vapors thus produced so as to cause a rise in temperature of the material to a maximum of 200° F., and removing and cooling the thereby resulting product.

13. The process of converting wet garbage into a relatively dry and innocuous end-product suitable as a fertilizer base which comprises the steps of comminuating said garbage, squeezing the excess water therefrom, mixing the same with humus, calcium carbonate, gypsum and a mixed culture of thermophile soil-bacteria, transferring the resulting mixture to a confined space, agitating and aerating it therein whereby heat develops as the result of the bacterial action thereby causing gradual elimination of moisture and further comminution of the product, controlling the escape of the heated vapors thus produced so as to cause a rise in temperature of the material to a maximum of 200° F., and thereupon heating the product by applied heat to a temperature of from 200–250° F. to dry the same.

14. A fertilizer base consisting of the substantially dry end-product produced by the action of a predominatingly thermophile flora on putrescible organic waste in admixture with peat humus, calcium carbonate and gypsum.

15. The process of producing a fertilizer base which comprises continuously passing putrescible organic waste through a warm zone in which it is subjected to bacterial decomposition by thermophile bacteria.

16. The process of producing a fertilizer base which comprises continuously passing putrescible organic waste through a fermentation zone in which thermophile bacteria constitute the predominating microbiological flora until a substantially dry inoffensive end-product is obtained.

GEORGE H. EARP-THOMAS.